(12) United States Patent
Fujisawa et al.

(10) Patent No.: US 8,885,185 B2
(45) Date of Patent: Nov. 11, 2014

(54) IMAGE FORMING SYSTEM, CONTROLLER AND RASTERIZATION ACCELERATOR

(75) Inventors: Shinya Fujisawa, Tokyo (JP); Kiyoshi Takagi, Tokyo (JP); Takenori Kitada, Tokyo (JP); Hitoshi Koyanagi, Tokyo (JP)

(73) Assignee: Konica Minolta Holdings, Inc., Tokyo (JP)

(*) Notice: Subject to any disclaimer, the term of this patent is extended or adjusted under 35 U.S.C. 154(b) by 174 days.

(21) Appl. No.: 13/582,771

(22) PCT Filed: Feb. 3, 2011

(86) PCT No.: PCT/JP2011/052231
§ 371 (c)(1),
(2), (4) Date: Sep. 5, 2012

(87) PCT Pub. No.: WO2011/111446
PCT Pub. Date: Sep. 15, 2011

(65) Prior Publication Data
US 2013/0003101 A1    Jan. 3, 2013

(30) Foreign Application Priority Data

Mar. 8, 2010   (JP) ................................ 2010-050529

(51) Int. Cl.
| | | |
|---|---|---|
| G06F 3/12 | (2006.01) | |
| H04N 1/00 | (2006.01) | |
| G03G 15/00 | (2006.01) | |
| G06K 15/02 | (2006.01) | |
| G03G 21/14 | (2006.01) | |
| H04N 1/413 | (2006.01) | |

(52) U.S. Cl.
CPC ........ *G03G 21/14* (2013.01); *H04N 2201/0094* (2013.01); *H04N 1/00127* (2013.01); *G03G 15/502* (2013.01); *G06K 15/1849* (2013.01); *G06F 3/1297* (2013.01); *G06K 15/1865* (2013.01); *H04N 1/413* (2013.01)

USPC ........... 358/1.13; 358/1.9; 358/2.1; 358/1.15; 358/1.16; 358/1.17

(58) Field of Classification Search
USPC ............. 358/1.13, 1.14, 1.15, 1.16, 1.17, 2.1, 358/1.9
See application file for complete search history.

(56) References Cited

U.S. PATENT DOCUMENTS 5,894,545 A * 4/1999 Fukuta ......................... 358/1.16
6,238,105 B1 * 5/2001 Pardo ........................... 358/1.17
(Continued)

FOREIGN PATENT DOCUMENTS

| JP | 10-207664 | 8/1998 |
|---|---|---|
| JP | 10207664 A * | 8/1998 |

(Continued)

*Primary Examiner* — Miya J Cato
(74) *Attorney, Agent, or Firm* — Lucas & Mercanti, LLP

(57) ABSTRACT

An image forming system comprising: a controller, provided with a list creation means to create a display list by analyzing PDL data, a decompression means to decompress compressed image data, a drawing means to execute drawing based on the image data, and a print data creation means to create the print data based on the image data, for sending the print data to a printer; and a rasterization accelerator, provided with a second drawing means to execute drawing processing based on the display list, and a compression means to compress the image data drawn by the second drawing unit, for sending the image data to the controller, wherein the rasterization accelerator comprises a determination means for determining, based on the information of the display list, whether to execute or not the compression of the image data, and a compression method in case of executing the compression.

13 Claims, 4 Drawing Sheets

(56) References Cited

U.S. PATENT DOCUMENTS

| | | |
|---|---|---|
| 8,493,612 B2 * | 7/2013 | Sweet et al. .................... 358/1.2 |
| 2003/0002076 A1 * | 1/2003 | Takayama et al. ........... 358/1.15 |
| 2005/0271281 A1 * | 12/2005 | Simard et al. ................ 382/225 |
| 2006/0239556 A1 * | 10/2006 | Misawa ........................ 382/176 |
| 2007/0053602 A1 * | 3/2007 | Kanatsu ........................ 382/244 |
| 2009/0059247 A1 * | 3/2009 | Kawasaki ...................... 358/1.8 |
| 2010/0046035 A1 * | 2/2010 | Kinoshita .................... 358/3.06 |
| 2012/0075666 A1 * | 3/2012 | Shibuya ...................... 358/1.15 |

FOREIGN PATENT DOCUMENTS

| | | |
|---|---|---|
| JP | 3862599 | 10/2006 |
| JP | 2006-313424 | 11/2006 |
| JP | 2007-110225 | 4/2007 |
| JP | 2009-296590 | 12/2009 |

* cited by examiner

IMAGE FORMING SYSTEM, CONTROLLER AND RASTERIZATION ACCELERATOR

CROSS REFERENCE TO RELATED APPLICATION

This Application is a 371 of PCT/JP2011/052231 filed on Feb. 3, 2011 which, in turn, claimed the priority of Japanese Patent Application No. 2010-050529 filed on Mar. 8, 2010, both applications are incorporated by reference herein.

TECHNICAL FIELD

The present invention relates to an image forming system, a controller and a rasterization accelerator.

BACKGROUND TECHNOLOGY

A multifunctional peripheral (MFP) provided with functions of printer, copying and facsimile have been known. The MFP is connected via a network to multiple computers. A user of each computer sends data of document and the like created by the computer to the MFP via the network. The MFP having received the data stores the data in a memory, forms an image according to the data on a recording medium such as a paper sheet, and outputs the image after fixing.

The MFP is provided with a control section to control each section, a controller to receive a PDL (Page Description Language) data for printing from a computer and analyze the PDL data to create a display list, and the like.

In order to hasten the processing until printing, a rasterization accelerator may be connected to the controller. The controller analyzes the received PDL data to create the display list, and sends this display list to the rasterization accelerator. The rasterization accelerator expands a bitmap data (drawing data) based on the display list, and compresses the image data to send toward the controller. In this way, by connecting the rasterization accelerator, lord of the controller can be reduced, and further, by compressing and sending the image data to the controller, the required sending time can be shortened, thus the processing until the printing can be hastened (refer the example the Patent Document 1).

PRIOR ART DOCUMENT

Patent Document

Patent Document 1:
Japanese Registration Patent No. 3862599

SUMMARY OF THE INVENTION

Problems to be Solved by the Invention

However, according to the Patent Document 1, since compression of the image data is executed uniformly with the same compression rate regardless of the type or volume of the image data, the most preferable compression for each image data cannot be executed. For example, in a case where the compression method is set to be lossy compression, there occurs a problem that the image data after the compression cannot be restored. Further, in a case where the compression method is set to be lossless compression, since the compression rate is low, there occurs a problem that the sending time to the controller is difficult to be shortened in the case of large image data volume.

The present invention is accomplished to solve the above problems and to provide an image forming system, controller and a rasterization accelerator that can execute the most suitable compression according to the type or volume of the image data, and can compress the image data as far as possible to shorten the sending time toward the controller.

Means for Solving the Problems

The invention described in item 1 is an image forming system including:

a controller, provided with a list creation means to create a display list by analyzing PDL data, a decompression means to decompress compressed image data, a first drawing means to execute drawing processing based on the image data, and a print data creation means to create the print data based on the image data, for sending the print data to a printer; and a rasterization accelerator, provided with a second drawing means to execute drawing processing based on the display list, and a first compression means to compress the image data drawn by the second drawing means, for sending the image data to the controller, wherein the rasterization accelerator is characterized in comprising a determination means for determining, based on the information of the display list created by the list creation means, whether to execute or not the compression of the image data by the first compression means, and a compression method in case of executing the compression by the first compression means.

The invention described in item 2 is the image forming system of item 1, characterizing in that the compression processing of the image data by the first compression means includes a lossless compression processing, a lossy compression processing, and a binarization processing.

The invention described in item 3 is the image forming system of item 2, characterizing in that the information of the display list includes information of whether to execute or not the drawing processing by the first drawing means after executing the drawing processing by the second drawing means, and wherein, in case of receiving the information from the display list that the drawing processing is not executed by the first drawing means, the determination means determines to use the lossy compression processing in the image data compression by the first compression means.

The invention described in item 4 is the image forming system of item 3, characterizing in that, in a case where the determination means has determined to use the lossy compression processing in the image data compression by the first compression means, the compression means executes the lossy compression of the image data, and the print data creation means creates the print data based on the lossy compressed image data.

The invention described in item 5 is the image forming system of item 2, characterizing in that the information of the display list includes information of whether to execute or not the drawing processing by the first drawing means after executing the drawing processing by the second drawing means, and wherein, in case of receiving the information from the display list that the drawing processing is executed by the first drawing means, the determination means determines to use the lossless compression processing in the image data compression by the first compression means.

The invention described in item 6 is the image forming system of item 5, characterizing in that the controller is provided with a second compression means, wherein in a case where the determination means has determined to use the lossless compression processing in the image data compression by the first compression means, the first compression means executes the lossless compression of the image data, the decompression means decompresses the lossless compressed image data, the first drawing means draws an image based on the decompressed image data, the second compression means executes the lossy compression of the image data of the drawn image, and the print data creation means creates the print data based on the lossy compressed image data.

The invention described in item 7 is the image forming system of item 2, characterizing in that the information of the display list comprises information of whether to execute processing with speed priority until printing or not, and wherein in case of receiving information from the display list that the processing with speed priority until printing is to be executed, the determination means determines to use the binarization processing in the image data compression by the first compression means.

The invention described in item 8 is the image forming system of item 7 characterizing in that the rasterization accelerator comprises a judgment means to judge whether volume of the binarized image data is not more than a prescribed value, and wherein in a case where the determination means has determined to use the binarization processing for the image data compression by the first compression means, the first compression means binarizes the image data, and in a case where volume of the binarized image data is judged by the judgment means to be more than the prescribed value, the first compression means executes the lossy compression of the binarized image data, and the print data creation means creates the print data based on the lossy compressed image data.

The invention described in item 9 is the image forming system of items 1 or 2, characterizing in that the information of the display list includes volume of the image data to be drawn, and wherein in case of obtaining the information from the display list that the volume of the image data is not more than a prescribed a prescribed value, the determination means determines not to compress the image data by the first compression means.

The invention described in item 10 is the image forming system of item 9, characterizing in that the controller is provided with a second compression means to compress the image data, and wherein, in a case where the determination means has determined not to compress the image data by the first compression means, the second drawing means draws an image based on the display list, the second compression means executes the lossy compression of the image data of the drawn image, and the print data creation means creates the print data based on the lossy compressed image data.

The invention described in item 11 is the image forming system of item 2 characterizing in that the rasterization accelerator is provided with a judgment means to judge whether the volume of the lossy compressed image data is not less than a prescribed value, and wherein in a case where the determination means has determined that the volume of the lossy compressed image data is not less than the prescribed value, the first compression means further compresses the image data with lossless compression, the decompression means decompresses the lossless compressed image data, and the print data creation means creates the print data based on the decompressed image data.

The invention described in item 12 is the image forming system of item 2 characterizing in that the controller is provided with a second compression means to compress the image data, and the accelerator is provided with a judgment means to judge whether the volume of the binarized image data is not more than a prescribed value, and wherein in a case where the volume of the binarized image data is judged by the judgment means to be not more than the prescribed value, the second compression means executes the lossy compression of the image data, and the print data creation means creates the print data based on the lossy compressed image data.

The invention described in item 13 is the image forming system of item 2 characterizing in that the information of the display list includes information of whether to execute or not plural times of drawing by the second drawing means, wherein in case obtaining the information of executing the plural times of drawing by the second drawing means, the first compression means executes the lossless compression of the image data of the image drawn by the second drawing means.

The invention described in item 14 is controller which is connectable to a rasterization accelerator and execute drawing processing based on a display list, the controller comprising:

a list creation means to create a display list by analyzing PDL data;

a list sending means to send the display list created by the list creation means to the rasterization accelerator;

a data receiving means to receive image data from the rasterization accelerator;

a drawing means to draw an image based on the image data received by the data receiving means;

a decompression means to decompress compressed image data;

a compression means to compress the image data;

a print data creation means to create print data from the display list, based on the image data of the drawn image;

a print data sending means to send the print data to a printer, a first data processing means which creates the print data by the print data creation means based on the image data lossy compressed by the rasterization accelerator, and sends the print data by the print data sending means to the printer;

a second data processing means which decompresses, by the decompression means, the image data compressed with lossless compression in the rasterization accelerator, draws an image by the drawing means based on the decompressed image data, compresses the image data of the drawn image with lossy compression by the compression means, creates the print data by the print data creation means based on the lossy compressed image data, and sends the print data by the print data sending means to the printer; and a third data processing means which compresses, with lossy compression by the compression means, non-compressed image data or image data binarized in the rasterization accelerator, creates the print data by the print data creation means based on the lossy compressed image data, and sends the print data by the print data sending means to the printer.

The invention described in item 15 is a rasterization accelerator which is connectable to a controller, analyzes PDL data, and creates a display list, the rasterization accelerator comprising:

a list receiving means to receive the display list created by the controller;

a drawing means to execute drawing processing based on the display list received by the list receiving means;

a compression means to compress image data of an image drawn by the drawing means;

a data sending means to send the image data of the image drawn by the drawing means to the controller;

a first compression control means to send the image data of the image drawn by the drawing means to the controller without executing the compression;

a second compression control means to send the image data of the image drawn by the drawing means to the controller with executing lossy compression by the compression means;

a third compression control means to send the image data of the image drawn by the drawing means to the controller with executing lossless compression by the compression means;

a fourth compression control means to send the image data of the image drawn by the drawing means to the controller with executing binarization processing by the compression means; and a fifth compression control means to send the image data of the image drawn by the drawing means to the controller with further executing the lossy compression after executing the binarization processing by the compression means.

Effects of the Invention

According to the invention described in item 1, the determination means determines, based on the information of the display list, whether to execute the compression of the image data by the compression means and a compression method in case of executing the compression by the compression means. Namely, since the information of the display list varies according to the types or the capacities of the image data to be printed, the most suitable compression can be executed according to the types or the capacities of the image data, and the sending time can be shortened by executing the compression of the image data as far as possible.

According to the invention described in item 2, since the compression means can execute plural types of compression processing, the most suitable compression can be performed according to the types or the capacities of the image data.

According to the invention described in items 3 and 4, in case of not executing the re-drawing by the drawing means, the compression rate of the image data can be enlarged by applying the lossy compression of the image data to shorten the sending time toward the controller.

According to the invention described in items 5 or 6, in case of executing the re-drawing by the drawing means, much deterioration of the image can be prevented and image quality of a printed image can be suppressed of degradation by executing the lossless compression.

According to the invention described in items 7 or 8, in case of executing the re-drawing by the drawing means, in case of putting the speed priority until printing, the sending time to the controller can be shortened and the processing time can be shortened by applying the binarization processing on the image data.

According to the invention described in items 9 or 10, in case that the volume of the image data is not more than a prescribed value, an overhead accompanied by the compression can be reduced and the processing time can be shortened without executing the compression of the image data.

According to the invention described in item 11, in the case where the determination means has determined that the volume of the lossy compressed image data is not less than the prescribed value, the image data volume can be reduced and the sending time can be shortened by applying the lossless compression of the image.

According to the invention described in item 12, in the case where the determination means has determined that the volume of the lossy compressed image data is greater than the prescribed value, since the image data is applied with the lossy compression and sent to the controller, the sending time of the image data can be shortened.

According to the invention described in item 13, in the case where the second drawing means executes the plural times of drawing, much deterioration of the image can be prevented and imager quality of a printed image can be suppressed of degradation by executing the lossless compression of the image data.

According to the invention described in item 14, since the controller changes the processing of the image data by each image data of different compression method, the most suitable compression can be executed according to the image data.

According to the invention described in item 15, since the rasterization accelerator cm execute plural types of different compression processing, the most suitable compression can be executed according to the image data.

DETAILED DESCRIPTION OF THE PREFERRED EMBODIMENT

Herein after, an image forming system, a controller, and a rasterization accelerator will be described by referring the drawings.

<Configuration of the Image Forming System>

Figure 1:
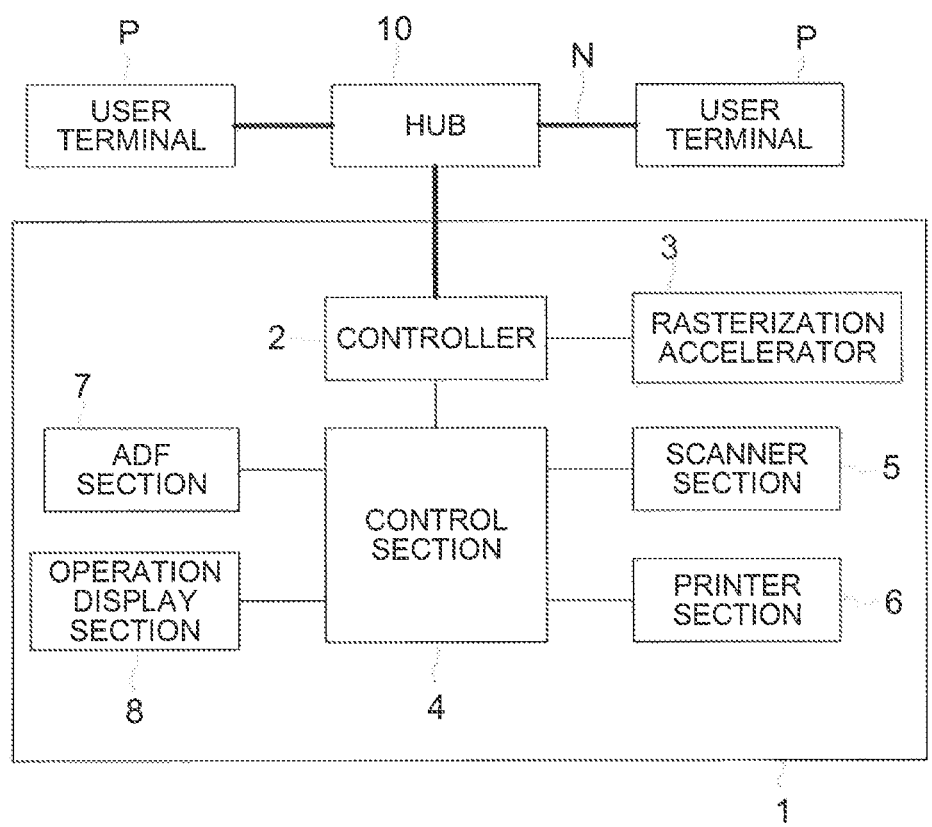
FIG. 1 is a block diagram showing an outline configuration of an image forming system.

As shown in FIG. 1, image forming system 1 is a multi-functional peripheral (MFP) provided with functions of printer, copying and facsimile. The image forming system 1 is connected a HUB 10 to a network N. The image forming system 1 is connected via the network N to a plurality of user terminal P. Namely, the image forming system receives PDL, (Page Description Language for image formation) data front the user terminal connected to the network N, and creates an image to be printed based on the received PDL data.

As shown in FIG. 1, the image forming system 1 is provided with controller 2, rasterization accelerator 3, control section 4, scanner section 5, printer section 6, ADF section 7 (Auto Document Feeder), and operation display section 8.

(Controller)

Figure 2:
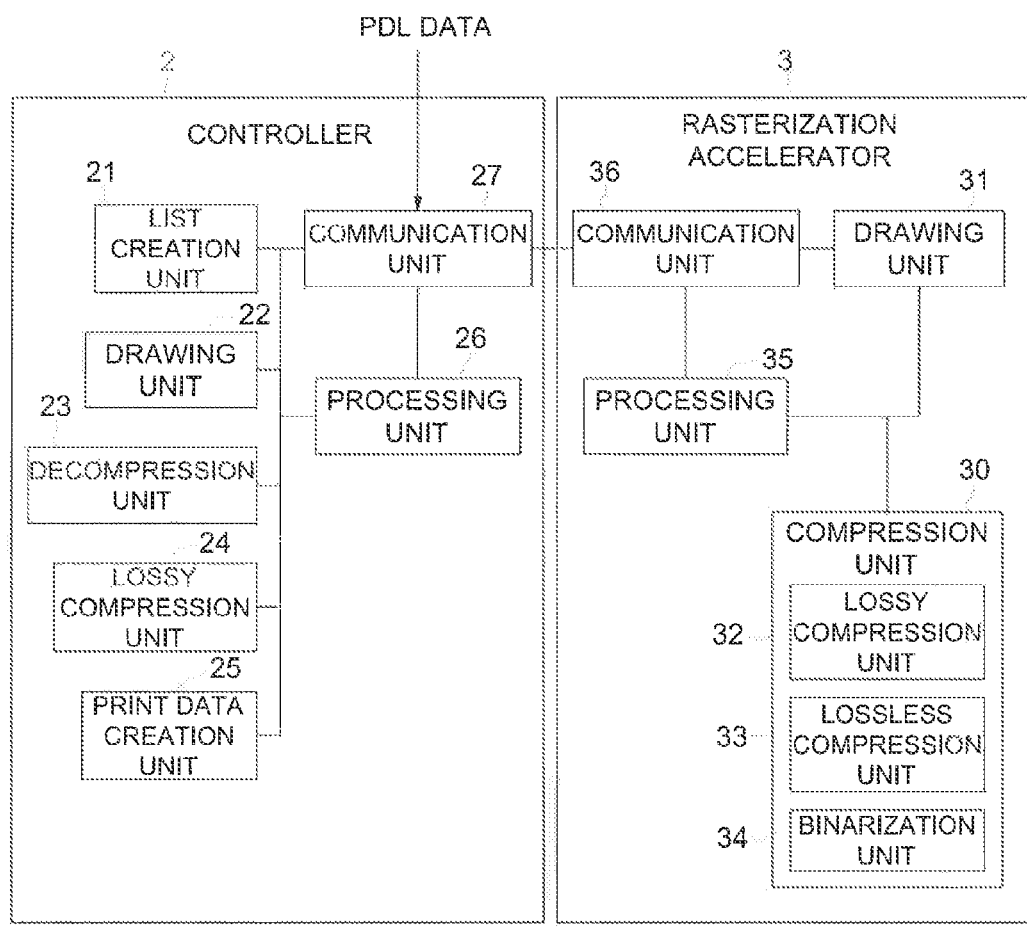
FIG. 2 is a block diagram showing outline configurations of a controller and a rasterization accelerator.

As shown in FIGS. 1 and 2, controller 2 is connected to the network N and receives the PDL data for printing from the user terminal P. The controller 2 sends a created print data to the printer section 6 via the control section 4.

The controller 2 determines a communication speed and a communication mode by executing an auto-negotiation between the HUB 10, and receives the PDL data from the HUB 10.

The controller 2 is connected to the rasterization accelerator 3.

The controller 2 is provided with list creation unit 21, drawing unit 22, decompression unit 23, lossy compassion unit 24, print data creation unit 25, processing unit 26 and communication unit 27.

The list creation unit 21 analyzes the PDL data received from the HUB 10 and creates a display list. Namely, the list creation unit 21 functions as a list creation means. Here, the display list is a drawing command for the drawing unit 22 to develop into image data.

Information of the display list includes information of whether the controller 2 (drawing unit 22 to be described later) executes drawing processing or not, after the rasterization accelerator 3 (drawing unit 31 to be described later) has executed a drawing processing, by using the image data (such as bitmap data) of the drawn image. Specifically, the information of whether the controller 2 executes or not the drawing processing such as TRAP processing, or color conversion processing, after the rasterization accelerator 3 sent the image data to the controller 2, is included in the display list.

The information of the display list includes information of whether or not to execute the processing with priority of processing speed until printing.

The information of the display list includes information of whether or not plural times of drawing (overwriting) processing are executed in the rasterization accelerator 3.

The information of the display list includes information regarding a volume of the image data of the image to be drawn.

The drawing unit 22 executes re-drawing based on the image data of the image drawn by the rasterization accelerator 3, and in addition, in a case where the image data is not compressed by the rasterization accelerator 3, executes the drawing based on the image data. Namely, the drawing unit 22 functions as a drawing means.

The decompression unit 23 decompresses the image data compressed in the rasterization accelerator 3. Namely the decompression unit 23 functions as a compression means.

The lossy compression unit 24 executes lossy compression of the image data as a preliminary processing for converting the image data to the print data. Namely, the lossy compression unit 24 functions as a second compression means.

The print data creation unit 25 creates the print data for sending to the printer section 6. Namely the print data creation section 25 functions as a print data creating means.

The compression unit 26 is able to allow the print data creation unit 25 to create the print data based on the image data applied with lossy compression in rasterization accelerator 3, and allow the communication unit 27 to send the created print data to the printer section 6. Namely the processing unit 26 functions as a first data processing means.

The processing unit 26 is able to allow the decompression unit 23 to decompress the image data compressed with lossless compression in the rasterization accelerator 3, allow the drawing unit 22 to draw an image based on the decompressed image data, allow the lossy compression unit 24 to execute the lossy compression of the image data of the drawn image, allow the print data creation unit 25 to create the print data based on the lossy compressed image data, and allow the communication unit 27 to send the print data to the printer section 6. Namely, the processing unit 26 functions as a second data processing means.

The processing unit 26 is able to allow the second compression means to execute the lossy compression on the non-compressed image data or the image data binarized by the rasterization accelerator 3, allow the print data creation unit 25 to create the print data based on the lossy compressed image data, and allow the communication unit 27 to send the print data to the printer section 6. Namely, the processing unit 26 functions as a third data processing means.

The communication unit 27 is connected to the HUB 10 and the rasterization accelerator 3.

The communication unit 27 functions as a PDL data receiving means for receiving the PDL data from the HUB 10.

The communication unit 27 functions as list sending means for sending the display list created by the list creation unit 21 to the rasterization accelerator 3.

The communication unit 27 functions as a data receiving means for receiving the image data of the image drawn by the rasterization accelerator 3.

The communication unit 27 functions as a print data sending means for sending the created print data to the printer section 6.

(Rasterization Accelerator)

As shown in FIGS. 1 and 2, the rasterization accelerator 3 is connected to the controller 2, and sends the image data to the controller 2. The rasterization accelerator 3 is provided with drawing unit 31, lossy compression unit 32, loaders compression unit 33, binarization unit 34, processing unit 35, and communication unit 36.

The drawing unit 31 executes a drawing based on the display list received from the communication unit 27 of the controller 2. Namely, the drawing unit 31 functions as a second drawing means.

The lossy compression unit 32 executes the lossy compression of the image data of the image drawn by the drawing unit 31. Namely, the lossy compression unit 32 functions as the compression unit 30 (compression means).

The lossless compression unit 33 executes the lossless compression of the image data of the image drawn by the drawing unit 31. Namely, the lossless compression unit 33 functions as the compression unit 30 (compression means).

The binarization unit 34 executes the binarization of the image data of the image drawn by the drawing unit 31. Namely, the binarization unit 34 functions as the compression unit 30 (compression means).

The processing unit 35 determines whether to execute the image data compression, and the compression method (lossy compression, lossless compression, or binarization) in the case of compressing the image data, from the information of the display list created by the list creation unit 21. Namely the processing unit 35 functions as a determination means.

The processing unit 35 is able to allow the communication unit 36 to send the image data of the image drawn by the drawing unit 31, without applying the compression. Namely the processing unit 35 functions as a first compression control means.

The processing unit 35 is able to allow the lossy compression unit 32 to execute the lossy compression of the image data of the image drawn by the drawing unit 31, and allow the communication unit 36 to send the lossy compressed data to the controller 2. Namely the processing unit 35 functions as a second compression control means.

The processing unit 35 is able to allow the lossless compression unit 33 to execute the lossless compression of the image data of the image drawn by the drawing unit 31, and allow the communication unit 36 to send the lossless compressed data to the controller 2. Namely the processing unit 35 functions as a third compression control means.

The processing unit 35 is able to allow the binarization unit 34 to execute the binarization of the image data of the image drawn by the drawing unit 31, and allow the communication unit 36 to send the binarized data to the controller 2. Namely the processing unit 35 functions as a fourth compression control means.

The processing unit 35 is able to allow the binarization unit 34 to execute the binarization of the image data of the image drawn by the drawing unit 31, further allow the lossy compression unit 32 to execute the lossy compression after the binarization, and allow the communication unit 36 to send the compressed data to the controller 2. Namely the processing unit 35 functions as a fifth compression control means.

The processing unit 35 judges whether or not the volume of the image data lossy-compressed by the lossy compression unit 32 is not less than a prescribed value. Further, the processing unit 35 judges whether or not the volume of the image data binarized by the binarization unit 35 is not more than a prescribed value. Namely, the processing unit 35 functions as a judgment means. Here, each of the prescribed value is an arbitrary value which can be freely established in accordance with the processing volume and communication speed of the controller 2 and the rasterization accelerator 3.

The communication unit 36 is connected to the controller 2.

The communication unit 36 functions as a list receiving means to receive the display list created by the list creation unit 21 of the controller 2.

The communication unit 36 functions as a data sending means to send the image data of the image drawn by the drawing unit 31 to the controller 2.

(Control Section)

The control section 4 shown in FIG. 1 is provided with publicly known CPU, ROM, RAM, memory unit and the like. The control section 4 reads out and develops on the RAM, various kinds of processing program such as a system program, an image forming processing program, sheet ejection processing program and the like, and executes an integrated control of each part of the image forming system, based on the developed program. The memory unit temporarily stores job data including the image data inputted from the scanner section 5 or the controller 2. Further, the memory unit memorizes the information regarding a preview image created to be used for displaying variable types of setting information set by a user's input operation via display operation section 8.

For example, the CPU creates a job based on the inputted data (image information) from the scanner section 5 or the controller 2, and the setting information inputted via the operation display section 8. And, by executing this job, the image is formed on a paper sheet.

Here, the job indicates a series of operation regarding the image formation. For example, in case of copying plural sheets of original documents, a series of operations regarding the copies of the plural original documents is the one job. Further, in case of executing plural sets of copying, the series of operations regarding the plural sets of copying is assumed to be one job.

(Scanner Section)

Scanner section 5, shown in FIG. 5, is provided with an image sensor such as a CCD, and a scanner control unit. The scanner control unit controls the drive of each part in the scanner section 5 based on the control signal from the control section 4. Specifically, the control section 4 controls to execute an exposure scanning of an original document surface placed on a contact glass, and to focus the reflection light on an image sensor to read the image. Then, by applying a photo-electric conversion to the imaged light signals, generates analogue image signals, and sends to the control section 4.

(Printer Section)

Printer section 6, shown in FIG. 6, is provided with an LD section (Laser Diode) and a printer control unit. The printer section 6 forms an image on a paper sheet based on the image data inputted from the control section 4. Here, in cases where the image data is sent to the image forming system 1 from the user terminal P, the printer section forms an image based on the data received from the controller 2.

The LD section is provided with an LD, a photosensitive drum, a charging unit, an exposure unit, a developing unit, a transfer unit, a cleaning unit, and a fixing unit. Further, the LD section is provided with various rollers such as a paper feeding roller for conveying the paper according to an internal conveyance path, a registration roller, a paper ejection roller, a conveying path switching plate, and a reversing unit. A conveying unit of the LD section feeds the paper specified for the job, based on the control from the printer control unit, and conveys the fed paper along the conveyance path. On the conveyance path of the LD section, provided are plural sensors. These sensors generate signals at the time when the paper passes, and output the signals to the printer control unit.

The printer control unit receives the control signal from the control section 4, and controls the movement of each part of the LD section. Further, the printer control unit counts the number of paper sheets fed by each job based on detection signals from the sensor provided on the conveyance path, and outputs to the control section 4.

In the printer section 6, based on instructions from the printer control unit, the surface of the photosensitive drum is charged by the charging unit, and based on the PWM signal inputted from the control section 4 the surface of the photosensitive drum is exposed to a laser beam from the LD to form an electrostatic latent image. Then, toners are attached on an area of the photosensitive drum surface having the electrostatic latent image, and at the transfer unit, the attached toners are transferred onto the paper sheet to form the image. And, after the transferred image is fixed on the paper sheet at the fixing unit, the image fanned paper sheet is conveyed to a post processing section by the ejection roller.

(ADP Section)

ADF section 7, shown in FIG. 1, is provided with an ADF control unit to execute the control of ADF section 7 based on control signals from the control section 4. The ADF section 7 automatically feeds original documents placed on an original document tray one by one onto the contact glass of the scanner section 5.

(Operation Display Section)

The operation display section, shown in FIG. 1, is provided with a display unit, an operation display control unit, an operation unit and a group of unillustrated operation keys.

According to display control signals from the operation display control unit, the display unit displays on a display screen various setting screens, status of the image, operation status of each function and the like. Further, on the display screen of the display unit, for example, provided is an operation unit structured with a pressure sensitive type (resistance film pressure type) touch panel provided with a lattice shaped transparent electrode. The operation unit detects the X-Y coordinates of the points touched by a finger or a touch pen, and outputs the detected position signals as the operation signals to the operation display control unit.

<Image Forming Process by Image Forming System>

Next, the image forming process by the image forming system will be described.

Figure 3:
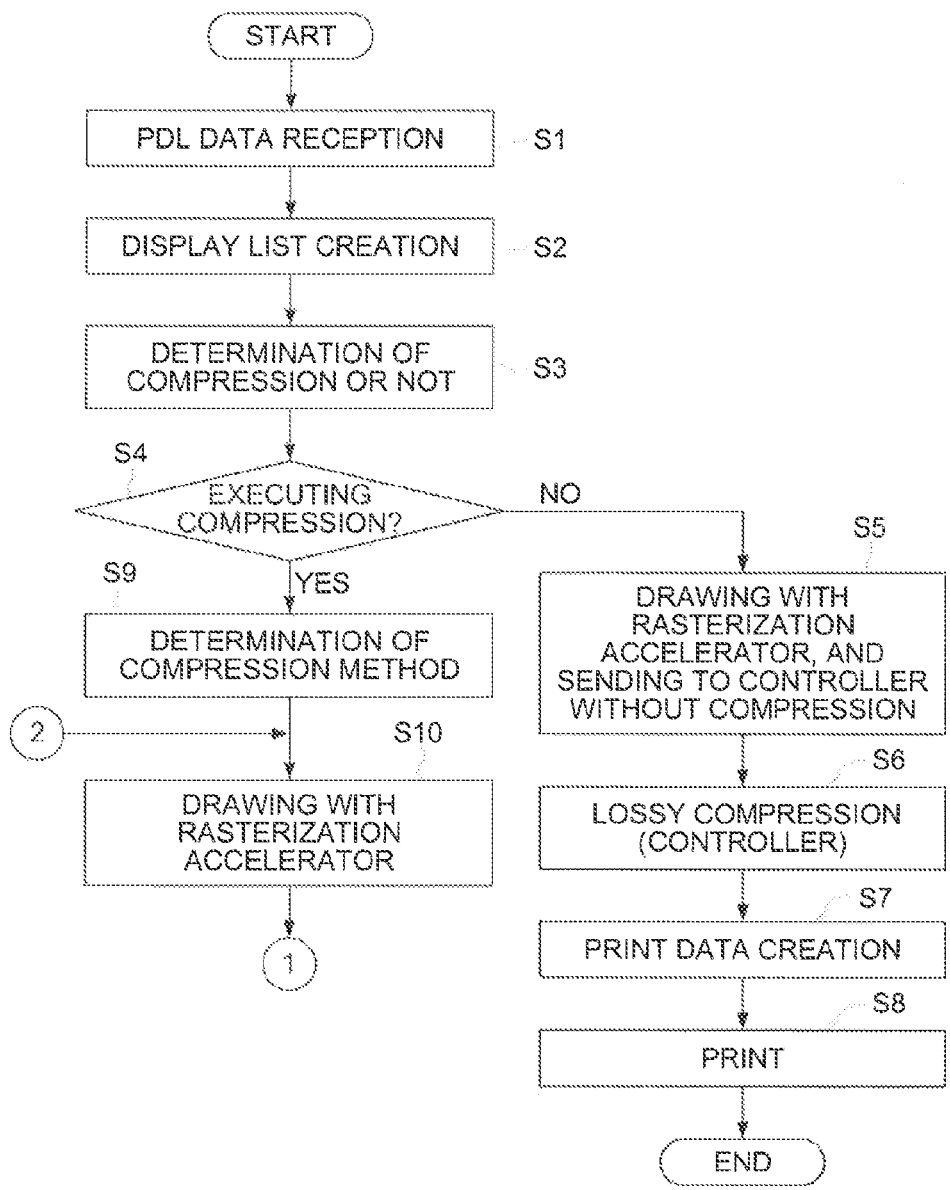
FIG. 3 is a flowchart showing an image forming processing by the image forming system.

As shown in FIG. 3, in case that the communication unit 27 of the controller 2 receives a PDL data from the user terminal P via the HUB 10 (step S1), the list creation unit 21 creates a display list based on the received PDL data (step S2). The created display list is sent from the communication unit 27 to the rasterization accelerator 3.

The communication unit 36 of the rasterization accelerator 3 receives the display list from the controller 2. In case of receiving the display list, the processing unit 35 determines whether to execute compression or not based on the information of the display list (step S3).

Here, the determination of compression or not is judged by necessity of image data compression based on the information of the display list. Specifically, in cases where the image data is in non-compression mode, or the volume of the image data is not more than a prescribed value, the processing unit 35 judges that the image data needs not be compressed by the rasterization accelerator 3, and determines not to execute the compression. This determination is memorized in the memory.

Next, the processing unit 35 judges to execute or not to execute the compression (step S4).

In the step S4, in case that the processing unit 35 has judged not to execute the compression of the image data (step S4: NO), the processing unit 35 allows to draw an image based on the display list, and returns to controller 2 without compression of the image data (step S5).

Next, the lossy compression unit 24 of the controller 2 executes the lossy compression of the image data (step S6).

Next, the print data creation unit 25 executes image processing based on the lossy compressed image data, and creates a print data (step S7).

Next, the printer section 6 forms an image on a recording medium based on the created print data (step S8).

On the other hand, in case that the processing unit 35 has judged to compress the image data (step S4: YES) at the step S4, the processing unit 35 determines the compression method (type of compression) of the image data based on the information of the received display list (step S9).

Here, the determination of compression method at the step 9 will be described.

After executing the drawing processing by the drawing unit 31 based on the display list, in case of receiving the information that the drawing processing by the use of the image data is not to be executed by the drawing unit 22, the processing unit 35 decides to use the lossy compression processing by the lossy compression unit 32, for the image data compression.

After executing the drawing processing by the drawing unit 31 based on the display list, in case of receiving the information that the drawing processing by the use of the image data is to be executed by the drawing unit 22, the processing unit 35 decides to use the lossless compression processing by the lossless compression unit 33, for the image data compression.

In case of receiving the information that the processing is to be executed with the highest priority on processing speed until printing, the processing unit 35 determines to use the binarization processing by the binarization unit 34.

In case of receiving the information that a plurality of times of drawing is to be executed by the drawing unit 31, the processing unit 35 determines to use the lossless compression processing by the lossless compression unit 33.

Next, the drawing unit 31 executes the drawing processing based on the display list (step S10).

Figure 4:
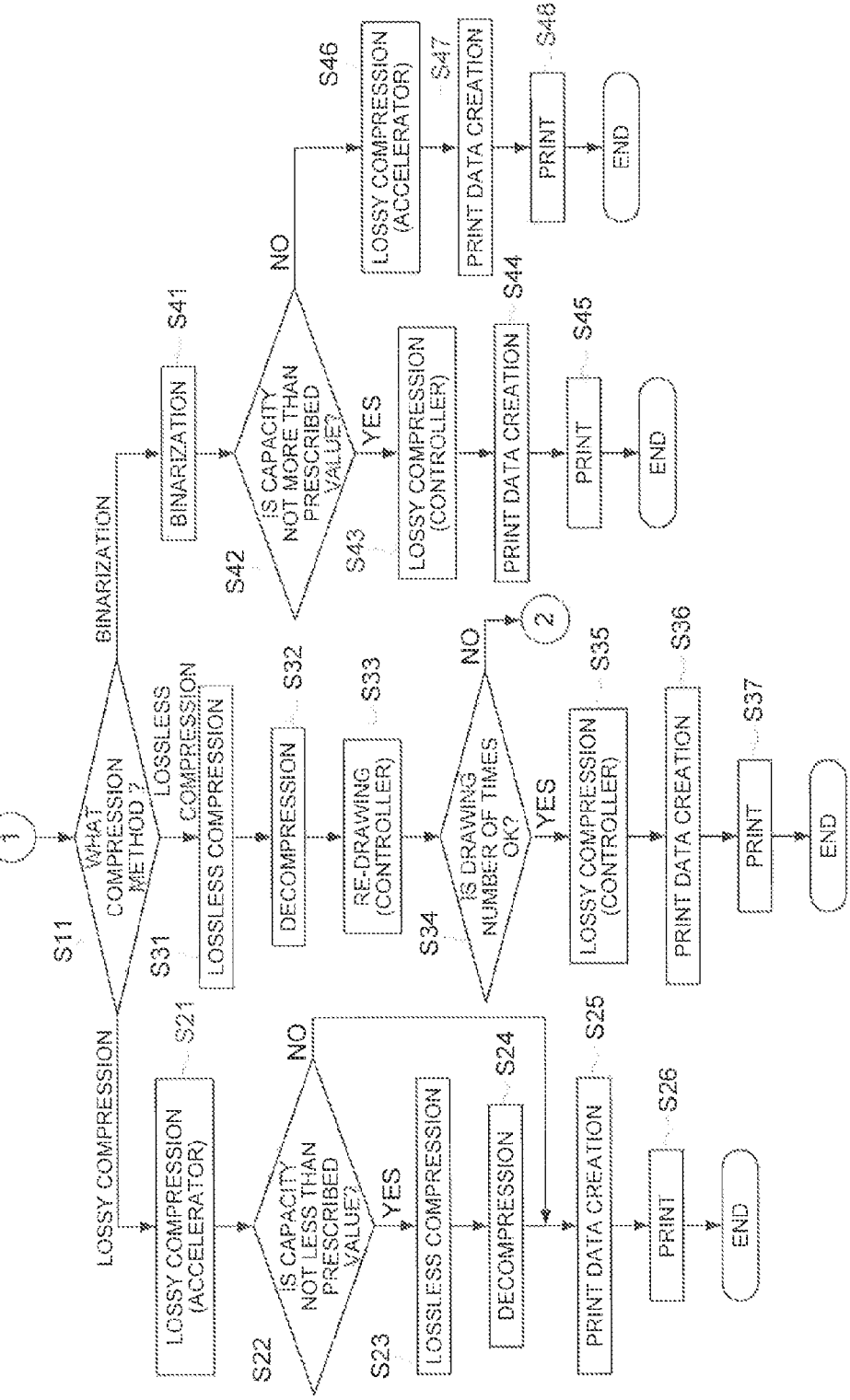
FIG. 4 is a flowchart showing an image forming processing by the image forming system.

Then, as shown in FIG. 4, the processing unit 35 judges what type of compression among the lossy compression, lossless compression, and the binarization has been determined for the image data compression (step S11).

(In Case that Compression Method has been Determined to be Lossy Compression)

In a case where the processing unit 35 judged that the image data is to be executed lossy compression by the lossy compression unit 32, the lossy compression unit 32 executes the lossy compression on the image data (step S21).

Next, the processing unit 35 judges whether the volume of the lossy compressed image data is not less than a prescribed value or not (step S22).

In case that the processing unit 35 judged that the volume of the lossy compressed image data is not less than a prescribed value in the step S22 (step S22: YES), the lossless compression unit 33 further executes the lossless compression on the image data (step S23).

Next, the decompression unit 23 decompresses the lossless compressed image data (step S24).

Next, the print data creation unit 25 executes the image processing based on the decompressed image data to create the print data (step S25).

Next, the printer section 6 forms an image on a recording medium based on the created print data (step S26).

In case that the processing unit 35 judged that the volume of the lossy compressed image data is less than a prescribed value in the step S22 (step S22: NO), the print data creation unit 25 executes the image processing based on the lossy compressed image data to create the image data (step S25).

Next, the printer section 6 forms an image on a recording medium based on the created print data (step S26).

(In Case that Compression Method has been Determined to be Lossless Compression)

In case that the processing unit 35 judged that the image data is to be executed lossless compression by the lossless compression unit 33, the lossless compression unit 33 executes the lossless compression on the image data (step S31).

Next, the decompression unit 23 decompresses the lossless compressed image data (step S32).

Next, the drawing unit 22 of the controller 2 executes a re-drawing based on the decompressed image data (step S33).

Next, in case of receiving the information that plural times of drawings are to be executed by the drawing unit 31, the processing unit 35 judges if the determined times of drawings have been executed or not by the drawing unit 31 (step S34).

In step S34, in a case where the processing unit 35 judged that the determined times of drawings have been executed by the drawing unit 31 (step S34: YES), the lossy compression unit 24 of the controller 2 executes the lossy compression of the image data (step S35).

Next, the print data creation unit 25 executes the image processing based on the lossy compressed image data, and creates a print data (step S36).

Next, the printer section 6 forms an image on a recording medium based on the created print data (step S37).

In the step S34, in a case where the processing unit 35 judged that the determined time of drawings have not been executed by the drawing unit 31 (step S34: NO), returning to the processing of step S10 the processing unit 26 of the controller 2 sends back the image data to the rasterization accelerator 3, and the drawing unit 31 of the rasterization accelerator 3 executes the image drawing based on the received image data.

(In Case that Compression Method has been Determined to be Binarization)

In the step S11, in a case where the processing unit 35 judged that the image data is to be binarized by the binarization unit 34, the binarization unit 34 executes the binarization of the image data (step S41).

Next, the processing unit 35 judges if volume of the binarized data is not more than the prescribed value or not (step S42).

In the step S42, in a case that the processing unit 35 judged that the volume of the binarized data is not more than the prescribed value (step S42: YES), the image data is sent to the controller 2 without being compressed by the rasterization accelerator 3, and the lossy compression unit 24 of the controller 2 executes the lossy compression of the image data (step S43).

Next, the print data creation unit 25 executes the image processing based on the lossy compressed image data to create the print data (step S44).

Next, the printer section forms an image on a recording medium based on the created print data (step S45).

In the step S42, in a case that the processing unit 35 judged that the volume of binarized data is more, than the prescribed value (step S42: No), the lossy compression unit 32 of the rasterized accelerator 3 executes the lossy compression of the image data step S46).

Next, the print data creation unit 25 executes the image processing based on the lossy compressed image data, and creates the print data (step S47).

Next the printer section forms an image on a recording medium based on the created print data (step S48).

Effect of the Image Forming System in the Embodiment

According to the above described image forming system 1, the processing unit 35 of the rasterization accelerator 3 determines, based on the information of the display list, whether to execute the compression of the image data and a compression method in case of executing the compression by the compression unit 30. Namely, since the information of the display list varies according to the types or the capacities of the image data, the most suitable compression can be executed according to the types or the capacities of the image data, and the sending time can be shortened by executing the compression of the image data as far as possible.

According to the invention described in item 14, since the controller changes the processing of the image data by each image data of different compression method, the most suitable compression can be executed according to the image data.

Further, since the rasterization accelerator 3 can execute plural different types of compression processing, the most suitable compression can be selected and executed according to the volume or type of the image data.

In case of not executing the re-drawing by the drawing unit 22, the compression rate of the image data can be enlarged by applying the lossy compression of the image data to shorten the sending time toward the controller 2.

On the other hand, in the case where the drawing unit 22 executes the re-drawing, much deterioration of the image can be prevented and degradation of imager quality of the printed image can be suppressed by executing the lossless compression of the image data.

In case of putting high priority on the processing speed until printing, by applying the binarization processing on the image data the sending time to the controller can be shortened and the processing time can be shortened.

In case that the volume of the image data is not more than a prescribed value, not by executing the compression of the image data, the overhead accompanied by the compression can be reduced and the processing time can be shortened.

In the case where the volume of the lossy compressed image data is not less than the prescribed value, the image data volume can be reduced and the sending time can be shortened by applying the lossless compression of the image.

In the case were the volume of the binarization image data is greater than the prescribed value, since the image data is applied with the lossy compression and sent to the controller 2, the sending time of the image data can be shortened.

In the case of executing the plural time of drawings, by executing the lossless compression of the image data, much deterioration of the image can be prevented and degradation of imager quality of a printed image can be suppressed.

The present invention is not restricted to the above-described embodiment, but is changeable within the scope of not changing the essential part of the invention.

For example, the compression processing of the image data is nor restricted only to lossy compression, lossless compression, or binarization, but may be further segmentalized according to the type of image data.

DESCRIPTION OF REFERENCE NUMERALS

1: image forming system
2: controller
3: rasterization accelerator
21: list creation unit (list creation means)
22: drawing unit (drawing means)
23: decompression unit decompression means)
24: lossy compression unit (compression means, second compression means)
25: print data creation unit (print data creation means)
26: processing unit (first to third data processing means)
27: communication unit (list sending means, data receiving means, print data sending means)
30: compression unit (compression means)
31: drawing unit (drawing means, second drawing means)
32: lossy compression unit (compression means)
33: lossless compression unit (compression means)
34: binarization unit (compression means)
35: processing unit (determination means, judgment means, first to fifth compression control means)
36: communication unit (list receiving means, data sending means)

What is claimed is:

1. An image forming system comprising:
a controller, provided with a list creation means to create a display list by analyzing PDL data, a decompression means to decompress compressed image data, a first drawing means to execute drawing processing based on the image data, and a print data creation means to create the print data based on the image data, for sending the print data to a printer; and
a rasterization accelerator, provided with a second drawing means to execute drawing processing based on the display list, and a first compression means to compress the image data drawn by the second drawing means, for sending the image data to the controller,
wherein the rasterization accelerator comprises a determination means for determining, based on information of the display list created by the list creation means, whether to execute or not the compression of the image data by the first compression means, and a compression method in case of executing the compression by the first compression means,
wherein compression processing of the image data by the first compression means includes lossless compression processing, lossy compression processing, and binarization processing,
wherein the information of the display list comprises information of whether to execute or not the drawing processing by the first drawing means after executing the drawing processing by the second drawing means, and wherein,
in case of receiving the information from the display list that the drawing processing is not to be executed by the first drawing means, the determination means determines to use the lossy compression processing in the image data compression by the first compression means.

2. The image forming system of claim 1, wherein in a case where the determination means has determined to use the lossy compression processing in the image data compression by the first compression means, the first compression means executes the lossy compression of the image data, and the print data creation means creates the print data based on the lossy compressed image data.

3. An image forming system comprising:
a controller, provided with a list creation means to create a display list by analyzing PDL data, a decompression means to decompress compressed image data, a first drawing means to execute drawing processing based on the image data, and a print data creation means to create the print data based on the image data, for sending the print data to a printer; and
a rasterization accelerator, provided with a second drawing means to execute drawing processing based on the display list, and a first compression means to compress the image data drawn by the second drawing means, for sending the image data to the controller,
wherein the rasterization accelerator comprises a determination means for determining, based on information of the display list created by the list creation means, whether to execute or not the compression of the image data by the first compression means, and a compression method in case of executing the compression by the first compression means,
wherein compression processing of the image data by the first compression means includes lossless compression processing, lossy compression processing, and binarization processing,
wherein the information of the display list comprises information of whether to execute or not the drawing processing by the first drawing means after executing the drawing processing by the second drawing means, and wherein,
in case of receiving the information from the display list that the drawing processing is to be executed by the first drawing means, the determination means determines to use the lossless compression processing in the image data compression by the first compression means.

4. The image forming system of claim 3, wherein the controller comprises a second compression means,
wherein in a case where the determination means has determined to use the lossless compression processing in the image data compression by the first compression means, the first compression means executes the lossless compression of the image data, the decompression means decompresses the lossless compressed image data, the first drawing means draws an image based on the decompressed image data, the second compression means executes the lossy compression of the image data of the drawn image, and the print data creation means creates the print data based on the lossy compressed image data.

5. An image forming system comprising:
a controller, provided with a list creation means to create a display list by analyzing PDL data, a decompression means to decompress compressed image data, a first drawing means to execute drawing processing based on the image data, and a print data creation means to create the print data based on the image data, for sending the print data to a printer; and
a rasterization accelerator, provided with a second drawing means to execute drawing processing based on the display list, and a first compression means to compress the image data drawn by the second drawing means, for sending the image data to the controller,
wherein the rasterization accelerator comprises a determination means for determining, based on information of the display list created by the list creation means, whether to execute or not the compression of the image data by the first compression means, and a compression method in case of executing the compression by the first compression means,
wherein compression processing of the image data by the first compression means includes lossless compression processing, lossy compression processing, and binarization processing,
wherein the information of the display list comprises information of whether to execute or not the processing with speed priority until printing, and wherein
in case of receiving information from the display list that the processing with speed priority until printing is to be executed, the determination means determines to use the binarization processing in the image data compression by the first compression means.

6. The image forming system of claim 5, wherein the rasterization accelerator comprises a judgment means to judge whether a volume of the binarized image data is not more than a prescribed value, and wherein
in a case where the determination means has determined to use the binarization processing for the image data compression by the first compression means, the first compression means binarizes the image data, and in a case where the volume of the binarized image data is judged by the judgment means to be more than the prescribed value, the first compression means executes the lossy compression of the binarized image data, and the print data creation means creates the print data based on the lossy compressed image data.

7. An image forming system comprising:
a controller, provided with a list creation means to create a display list by analyzing PDL data, a decompression means to decompress compressed image data, a first drawing means to execute drawing processing based on the image data, and a print data creation means to create the mint data based on the image data, for sending the print data to a printer, and
a rasterization accelerator, provided with a second drawing means to execute drawing processing based on the display list, and a first compression means to compress the image data drawn by the second drawing means, for sending the image data to the controller,
wherein the rasterization accelerator comprises a determination means for determining, based on information of the display list created by the list creation means, whether to execute or not the compression of the image data by the first compression means, and a compression method in case of executing the compression by the first compression means,
wherein the information of the display list comprises a volume of the image data for drawing an image, and wherein
in case of obtaining the information from the display list that the volume of the image data is not more than a prescribed a prescribed value, the determination means determines not to compress the image data by the first compression means.

8. The image forming system of claim 7, wherein the controller comprises a second compression means to compress the image data, and wherein in a case where the determination means has determined not to compress the image data by the first compression means, the second drawing means draws an image based on the display list, the second compression means executes the lossy compression of the image data of the drawn image, and the print data creation means creates the print data based on the lossy compressed image data.

9. An image forming system comprising:

a controller, provided with a list creation means to create a display list by analyzing PDL data, a decompression means to decompress compressed image data, a first drawing means to execute drawing processing based on the image data, and a print data creation means to create the print data based on the image data, for sending the print data to a printer, and a rasterization accelerator, provided with a second drawing means to execute drawing processing based on the display list, and a first compression means to compress the image data drawn by the second drawing means, for sending the image data to the controller, wherein the rasterization accelerator comprises a determination means for determining, based on information of the display list created by the list creation means, whether to execute or not the compression of the image data by the first compression means, and a compression method in case of executing the compression by the first compression means, wherein compression processing of the image data by the first compression means includes lossless compression processing, lossy compression processing, and binarization processing, wherein the rasterization accelerator comprises a judgment means to judge whether a volume of the lossy compressed image data is not less than a prescribed value, and wherein in a case where the determination means has determined that the volume of the lossy compressed image data is not less than the prescribed value, the first compression means further compresses the image data with lossless compression, the decompression means decompresses the lossless compressed image data, and the print data creation means creates the print data based on the decompressed image data.

10. An image forming system comprising:

a controller, provided with a list creation means to create a display list by analyzing PDL data, a decompression means to decompress compressed image data, a first drawing means to execute drawing processing based on the image data, and a print data creation means to create the print data based on the image data, for sending the print data to a printer; and a rasterization accelerator, provided with a second drawing means to execute drawing processing based on the display list, and a first compression means to compress the image data drawn by the second drawing means, for sending the image data to the controller, wherein the rasterization accelerator comprises a determination means for determining, based on information of the display list created by the list creation means, whether to execute or not the compression of the image data by the first compression means, and a compression method in case of executing the compression by the first compression means, wherein compression processing of the image data by the first compression means includes lossless compression processing, lossy compression processing, and binarization processing, wherein the controller comprises a second compression means to compress the image data, and the rasterization accelerator is provided with a judgment means to judge whether a volume of the binarized image data is not more than a prescribed value, and wherein in a case where the volume of the binarized image data is judged by the judgment means to be not more than the prescribed value, the second compression means executes the lossy compression of the image data, and the print data creation means creates the print data based on the lossy compressed image data.

11. An image forming system comprising:

a controller, provided with a list creation means to create a display list by analyzing PDL data, a decompression means to decompress compressed image data, a first drawing means to execute drawing processing based on the image data, and a print data creation means to create the print data based on the image data, for sending the print data to a printer; and a rasterization accelerator, provided with a second drawing means to execute drawing processing based on the display list, and a first compression means to compress the image data drawn by the second drawing means, for sending the image data to the controller, wherein the rasterization accelerator comprises a determination means for determining, based on information of the display list created by the list creation means, whether to execute or not the compression of the image data by the first compression means, and a compression method in case of executing the compression by the first compression means, wherein compression processing of the image data by the first compression means includes lossless compression processing, lossy compression processing, and binarization processing, wherein the information of the display list comprises information of whether to execute or not plural times of drawing by the second drawing means, wherein in case obtaining the information of executing the plural times of drawing by the second drawing means, the first compression means executes the lossless compression of the image data of the image drawn by the second drawing means.

12. A controller which is connectable to a rasterization accelerator and executes drawing processing based on a display list, the controller comprising:

a list creation means to create a display list by analyzing PDL data;

a list sending means to send the display list created by the list creation means to the rasterization accelerator;

a data receiving means to receive image data from the rasterization accelerator;

a drawing means to draw an image based on the image data received by the data receiving means;

a decompression means to decompress compressed image data;

a compression means to compress the image data;

a print data creation means to create print data from the display list, based on the image data of the drawn image;

a print data sending means to send the print data to a printer, a first data processing means which creates the print data by the print data creation means based on the image data compressed with lossy compression in the rasterization accelerator, and sends the print data by the print data sending means to the printer;

a second data processing means which decompresses, by the decompression means, the image data compressed with lossless compression in the rasterization accelerator, draws an image by the drawing means based on the decompressed image data, compresses the image data of the drawn image with lossy compression by the compression means, creates the print data by the print data creation means based on the lossy compressed image data, and sends the print data by the print data sending means to the printer; and a third data processing means which compresses, with lossy compression by the compression means, non-compressed image data or image data binarized in the rasterization accelerator, creates the print data by the print data creation means based on the lossy compressed image data, and sends the print data by the print data sending means to the printer.

13. A rasterization accelerator which is connectable to a controller, analyzes PDL data, and creates a display list, the rasterization accelerator comprising:

a list receiving means to receive the display list created by the controller;

a drawing means to execute drawing processing based on the display list received by the list receiving means;

a compression means to compress image data of an image drawn by the drawing means;

a data sending means to send the image data of the image drawn by the drawing means to the controller;

a first compression control means to send the image data of the image drawn by the drawing means to the controller without executing the compression;

a second compression control means to send the image data of the image drawn by the drawing means to the controller with executing lossy compression by the compression means;

a third compression control means to send the image data of the image drawn by the drawing means to the controller with executing lossless compression by the compression means;

a fourth compression control means to send the image data of the image drawn by the drawing means to the controller with executing binarization processing by the compression means; and a fifth compression control means to send the image data of the image drawn by the drawing means to the controller with further executing the lossy compression after executing the binarization processing by the compression means.

* * * * *